Oct. 5, 1926.　　　　　　　　　　　　　　　　　1,602,280
O. MELIN ET AL
HYDRAULIC POWER PLANT
Filed March 10, 1926　　2 Sheets-Sheet 1

Inventors
Otto Melin and
Clarence M. Melin
By Wilkinson & Huxta
Attorneys

Oct. 5, 1926. 1,602,280
O. MELIN ET AL
HYDRAULIC POWER PLANT
Filed March 10, 1926  2 Sheets-Sheet 2

Inventors
Otto Melin
Clarence M. Melin
By Wilkinson & Gunta
Attorneys

Patented Oct. 5, 1926.

1,602,280

UNITED STATES PATENT OFFICE.

OTTO MELIN AND CLARENCE M. MELIN, OF EMIGRANT, MONTANA, ASSIGNORS OF ONE-THIRD TO AUGUST W. T. ANDERSON, OF EMIGRANT, MONTANA.

HYDRAULIC POWER PLANT.

Application filed March 10, 1926. Serial No. 93,700.

The present invention relates to improvements in hydraulic power plants and consists in certain improvements over our prior similarly entitled U. S. Patent No. 1,505,909 granted August 19, 1924.

An object of the present invention is to provide improved counter-balance means for the water or fluid current wheel, and to further provide means whereby the counter-balance weight will be increased when the fluid current wheel dips to a greater extent than normal in the stream, as when the wheel, usually of wood, becomes heavier or water logged.

A further object of the invention lies in simplifying and strengthening the supporting frame work and in the mounting of the wheel and of the power transmission mechanism.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a side view of the improved hydraulic power plant constructed according to the present invention.

Figure 1:
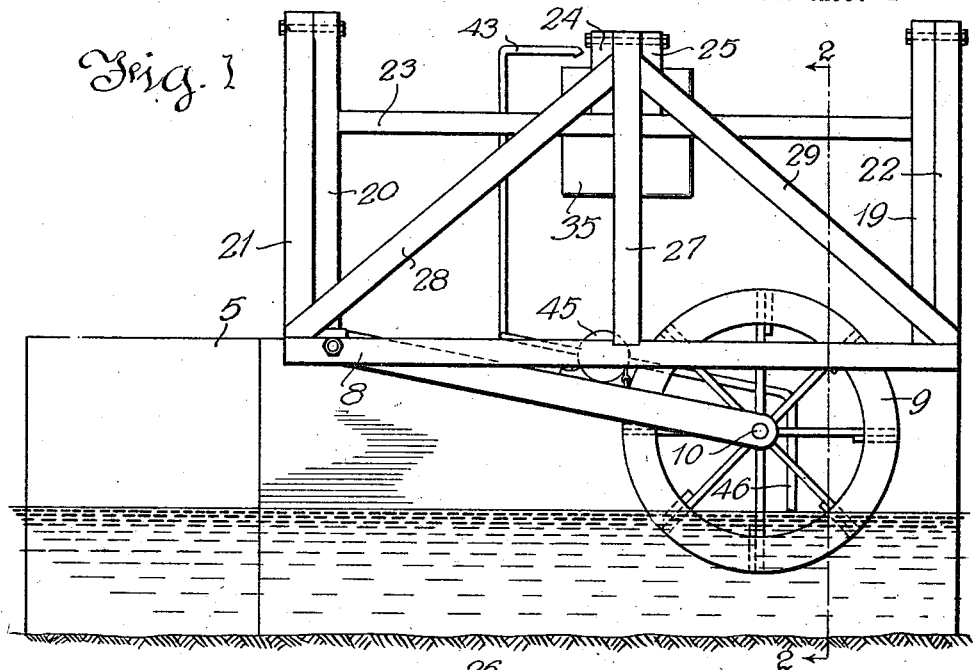
Figure 2:
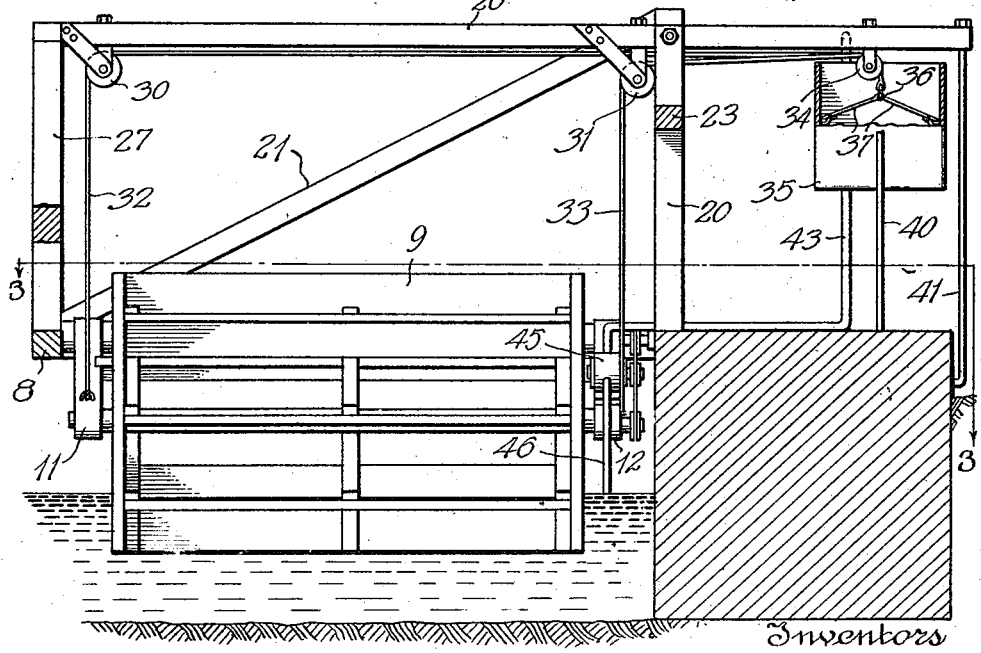
Figure 2 is a vertical section taken on the line 2—2 in Figure 1.

Referring more particularly to the drawings, 5 designates a float, boat, dock or other base to which the entire apparatus is secured. To the float are secured the beams 6 and 7, which extend outwardly beyond the float, and are connected at their outer ends by the cross beam 8 making with the base 5 a horizontally rectangular structure within which is carried the water wheel 9 having the supporting axle or spindle 10 journalled to rotate in bearings in the free ends of the two swinging arms 11 and 12. These arms are mounted to swing about the shaft 13 which is journalled in the bearing blocks 14 and 15 secured to the beam 7. The shaft 13 may also have a bearing in the cross beam 8, and it is preferably continued to and across the base 5, appropriate bearings being provided to receive the same. Power may be taken off from the shaft 13 for various purposes.

The arms 11 and 12 are preferably strengthened by the cross brace 16. The fluid current wheel 9 is of any appropriate construction and may be formed as shown in our prior patent aforesaid; although we prefer to further reinforce this wheel with the side rings 17 and 18 to which the paddles are connected.

The frame of the device further consists of the two vertical posts 19 and 20 erected upon the base 5 near the beams 6 and 7 and these posts may if desired be secured to the beams. Diagonal braces 21 and 22 extend from the upper ends of the posts 20 and 19 respectively to the outer ends of the beams 6 and 7 for assisting to support the same. The posts 19 and 20 are connected by the cross piece 23 at points intermediate their ends and this cross piece 23 serves to support the brackets 24 and 25 between which is secured the counter-weight beam 26. This beam extends over the base 5 and out over the rectangular open frame and has its outer end secured to a standard 27 erected upon an intermediate portion of the transverse beam 8. The standard 27 is braced by the diagonal braces 28 and 29 extending from the upper portion of the standard 27 down to opposite ends of the beam 8. The counter-weight beam 26 is provided with the pulleys 30 and 31 depending therefrom above the swinging arms 11 and 12 of the fluid current wheel and these pulleys are arranged to receive the cords or flexible connections 32 and 33, which are affixed respectively to the arms 11 and 12 and which extend vertically upward and thence horizontally toward the base 5 after passing through the pulleys 31 and 32.

Figure 3:
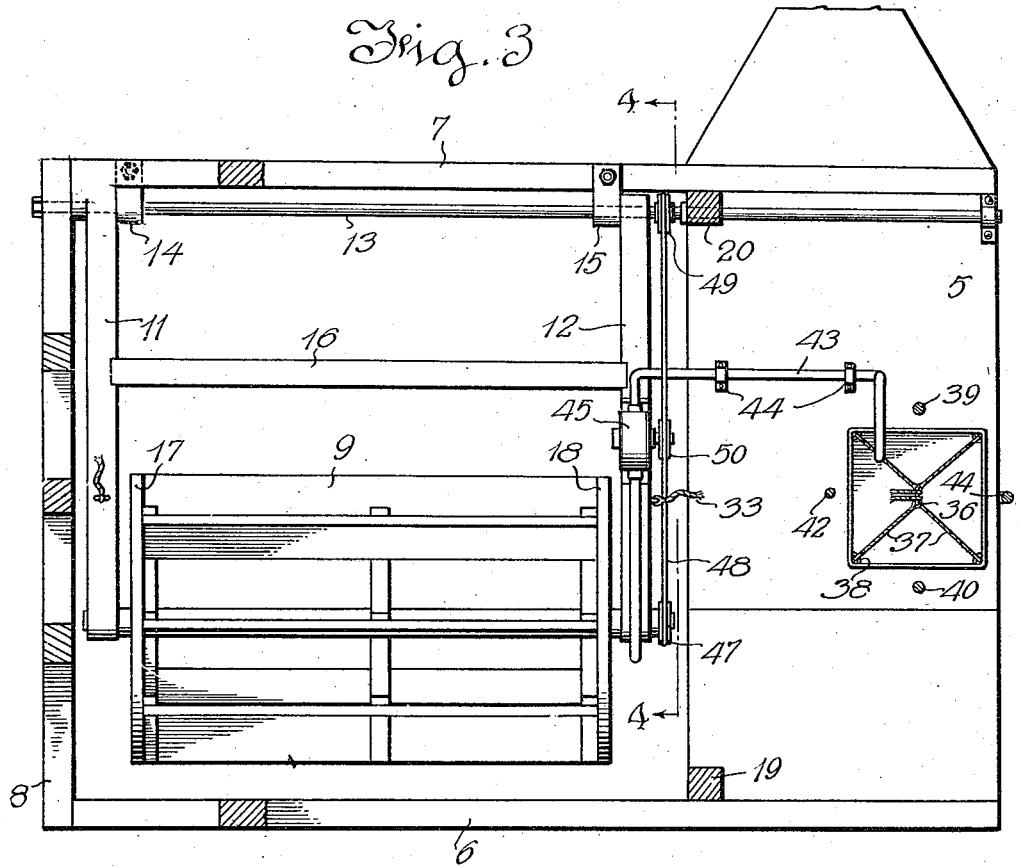
Figure 3 is a horizontal section taken on the line 3—3 in Figure 2.
Figure 4:
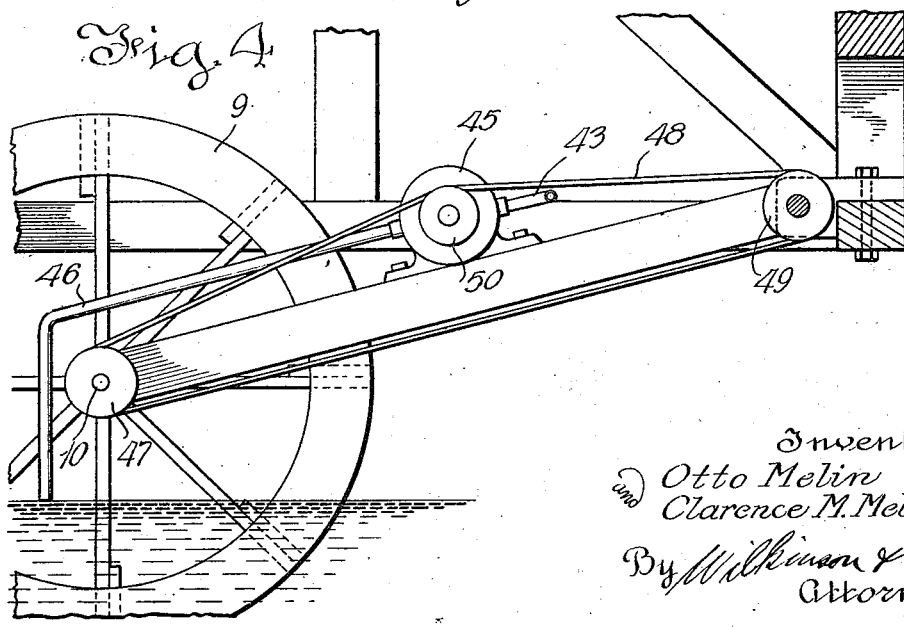
Figure 4 is a cross section taken on the line 4—4 in Figure 3.

A double grooved pulley 34 is also mounted upon the counter-weight beam 26 above the base 5 for receiving the two cords 32 and 33 whereby such cords may be directed downwardly to the counter-weight receptacle 35. The cords are coupled to a harness arrangement in the receptacle 35 which is best shown in Figure 3 and which consists of the central cross piece 36 connected by the four cords or links 37 to eyes or other fastenings 38 at the corner portions of the receptacle, which is preferably rectangular, and about midway the height thereof. The receptacle 35 is closed at its bottom and sides and is open at its top, the receptacle being mounted for vertical movement within a guiding cage provided between the rods 39, 40, 41 and 42. These rods extend between the counter-weight beam 26 and the base 5 and they loosely embrace the counter-weight receptacle 35.

The counter-weight receptacle is adapted to receive rocks or other weighty material and the receptacle is also adapted to receive water through the water hose or pipe 43 which may either connect with the bottom or side wall of the receptacle or be arranged as shown in the drawing with its delivery end disposed above the open end of the receptacle. In such instance the pipe may be a fixed stiff pipe and may be secured along the base as by the metal straps 44. The pipe extends to and along one of the swinging arms 12 of the water wheel which carries a water pump 45, the pipe 43 being coupled to the delivery end of said pump. The intake end of the pump is connected with another pipe or hose 46 and this conduit 46 extends down with its mouth near the surface of the fluid, but not into the body of the fluid in the normal position of the fluid current wheel. A stiff pipe is shown in the drawings but a flexible hose may equally well be used and supported appropriately by the arm 12.

The shaft 10 of the water wheel is provided with a pulley 47 at one end preferably the end between the swinging arm 12 and the base 5. Over this pulley is trained the belt 48 running to and extending about a second pulley 49 mounted on the power shaft 13. One run of the belt 48 extends over a pulley 50 on the rotor shaft of the pump 45 for operating said pump continuously with the rotation of the wheel 9 by the fluid current.

In operation the wheel is shown in its normal position in the water or other fluid body, and it is rotated by reason of the flow or current of the body of fluid against the paddles of the wheel. This results in the rotation of the wheel shaft 10 and of the pulley 47, belt 48 and power take-off shaft 13. The counter-weight receptacle may of itself be of a normal weight to counter-balance the water wheel, so that the water wheel will not dip too deeply into the water, but if necessary additional weights may be thrown in. As the wheel, which is usually of wood, becomes heavier by reason of its becoming water soaked or waterlogged, then the wheel would tend to dip deeper into the fluid current body which would interfere with its proper and free rotation and in other words would change the most effective position of the wheel. In order to remedy this the lower end of the pipe 46 will dip into the water as soon as the wheel gets below its most efficient position and as the pump 45 is being continuously operated it will thereupon promptly pump water from the connections 45, pump 46 and pipe 43 into the counter-balance receptacle 35. The water thus pumped to the counter-balance receptacle will outweigh the increased weight of the water wheel and the water wheel will thus again rise as the counter-balance receptacle 35 falls until the receiving end of the pipe 46 is again raised above the surface of the water.

It is obvious that various changes and modifications may be made in the details of construction and design of the above specifically described embodiment of this invention without departing from the spirit thereof, such changes and modification being restricted only by the scope of the following claims:—

What is claimed is:—

1. A hydraulic power plant comprising a base, a frame extending therefrom, a water wheel swingingly supported from said frame, a counter-balance receptacle coupled to said swinging wheel, and means associated with said wheel and receptacle whereby water may be pumped into the counter-balance receptacle on lowering of the wheel.

2. A hydraulic power plant comprising a base, a frame extending therefrom, a water wheel movably carried by said frame, a shiftable counter-balance receptacle coupled to said water wheel and having a closed bottom and sides and adapted to receive weights, and means associated with said wheel and carried therewith being normally out of the water but adapted to be lowered into the water with the descending wheel and whereby water may be circulated to said receptacle for increasing the counter-balance weight.

3. A hydraulic power plant comprising a base, a frame extending therefrom, a fluid current wheel movably carried by said frame, a counter-balance receptacle coupled to said wheel, a pump, connections from said pump to said receptacle and to the wheel, the wheel connection adapted to be normally out of the water but arranged to dip into the water on lowering of the wheel, and means whereby said pump may be operated from said wheel.

4. A hydraulic power plant comprising a base, a frame extending therefrom, arms swingingly mounted in said frame, a water wheel having a shaft journalled in said arms, a counter-weight receptacle coupled to said wheel, a pump carried by one of the arms and coupled to be driven from said wheel, a connection between the outlet of the pump and said receptacle, and a connection to the inlet of the pump normally held out of the water but adapted to dip into the water on lowering of said wheel.

OTTO MELIN.
CLARENCE M. MELIN.